Patented Oct. 6, 1925.

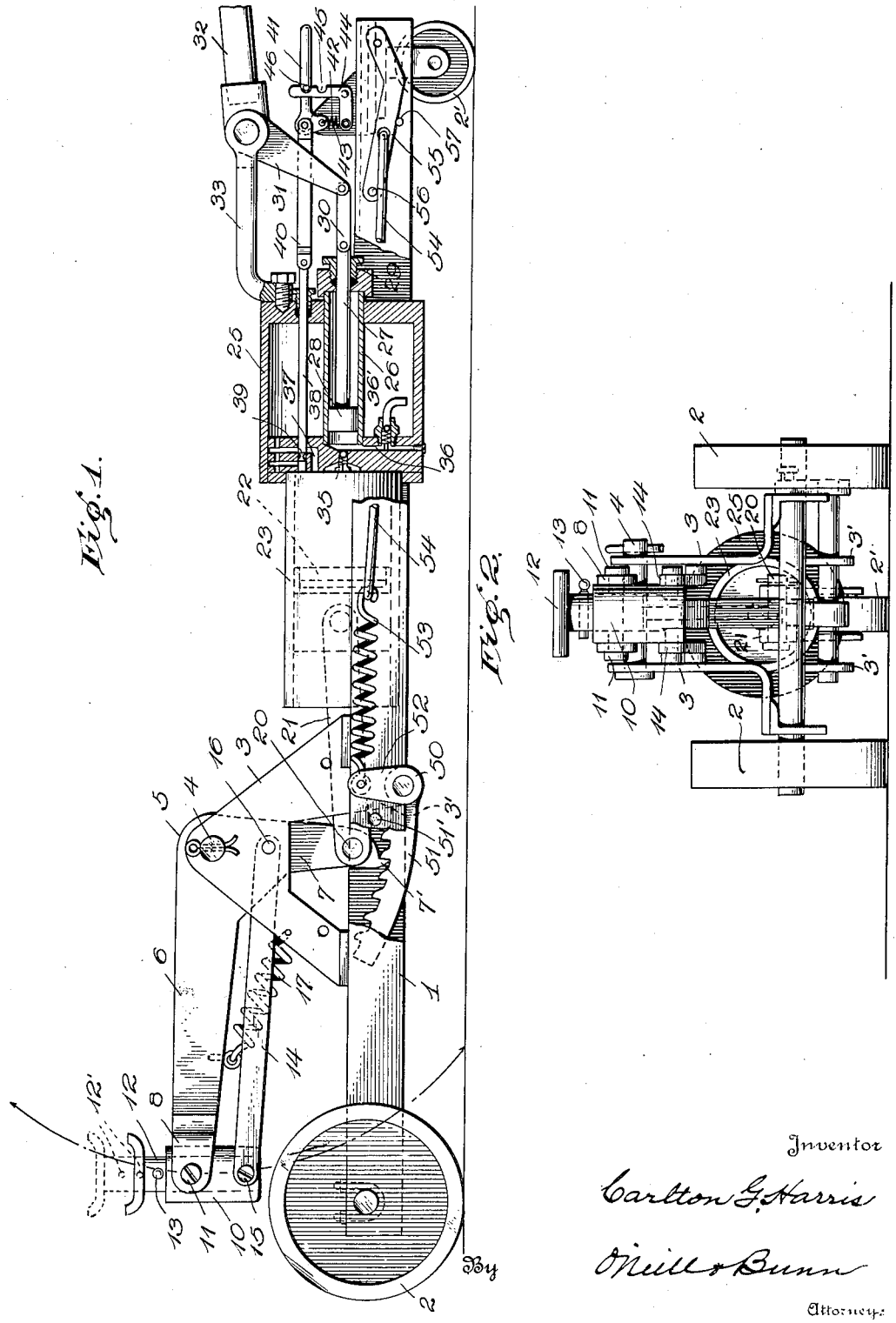

1,555,842

UNITED STATES PATENT OFFICE.

CARLTON G. HARRIS, OF DENVER, COLORADO, ASSIGNOR OF ONE-THIRD TO JERRY R. RATHBURN, OF DENVER, COLORADO.

LIFTING JACK.

Application filed March 13, 1925. Serial No. 15,244.

*To all whom it may concern:*

Be it known that I, CARLTON G. HARRIS, a citizen of the United States, and resident of Denver, in the county of Denver and State of Colorado, have invented certain new and useful Improvements in Lifting Jacks; and I do hereby declare the following to be a full, clear, and exact description of the invention, such as will enable others skilled in the art to which it appertains to make and use the same.

The invention relates to portable lifting jacks, and is particularly adapted to vehicle roller jacks for use in garages and like locations, not only for elevating the rear or front axles of automobiles, but for shifting the vehicles about in the garage, the apparatus comprising a relatively long horizontal frame, mounted upon suitable rollers or castors, provided at its forward end with a horizontally pivotally vertically swinging bell crank lever having a forwardly extending load arm and a downwardly extending power arm, the end of the load arm carrying a vertically swinging sleeve in which is adjustably mounted a load engaging shoe, the lower end of the sleeve being connected to the frame by a suitable rod which is effective in maintaining the sleeve and shoe in vertical position for all adjustments of the bell crank lever, the lower end of the power arm being connected with suitable actuating mechanism, carried by the rear of the frame, said actuating mechanism preferably comprising a fluid pressure apparatus, including a pump operated by a suitable brake or handle, a fluid pressure reservoir, a fluid pressure motor including a cylinder and a piston movable therein, the cylinder being suitably connected to the pump and with the fluid pressure reservoir by valved openings to admit pressure from the pump to the motor and to release the fluid pressure from the motor into the reservoir respectively, the piston being connected by a suitable rod to the lower end of the power arm of the bell crank lever. Preferably the device is provided with means for locking the bell crank lever in its various adjustments, thereby permitting the heavy strains to be taken off the actuating mechanism, said locking means being adapted to be thrown into and out of co-operative engagement with the lever at will. The co-ordination as indicated, involves a very simple, durable and efficient jack, having a wide range of operation, admitting of a relatively low or an unusually high lift of the load without involving a large number of moving parts of the jack proper requiring frequent adjustments and repairs.

The invention is illustrated in the accompanying drawings, in which;

Fig. 1 is a side elevation partly in section of the jack and its operating mechanism.

Fig. 2 is a front end elevation of the same.

Referring to the drawings, 1 indicates the body or frame constituting the support for the apparatus, including two longitudinal angle bars supported and spaced at their front ends by an axle 1', upon which supporting rollers 2, 2 are journalled, the rear end of the frame being supported by a suitable swiveled castor wheel 2' such as is usually employed in devices of this character.

Secured to the top flanges of the side members 1, 1 are two A-frames or brackets 3, each having a pendant section 3' extending downward between the side bars 1, 1. A pintle 4 is secured in aligning openings at the top of the A-frame members 3 and, mounted on said pintle, for movement in a vertical plane, is a bell crank lever 5 having a forwardly projecting arm 6 terminating in a fork 8 at its forward end, and a downwardly extending arm 7. The arm 6 is the load arm and the arm 7 the power arm, and as the arm 6 is relatively much longer than the arm 7 it will be apparent that the relatively short movement of the power arm will produce a long arcuate movement of the load arm.

Pivotally supported on studs 11 in the yoke 8, at the outer end of the power arm, is a sleeve 10, which is normally held in its vertical position for all positions and adjustments of the bell crank lever, by means of radius or reach rods 14 secured by pins 15 and 16 to the lower end of the sleeve and to the bracket 3, respectively, said rods 14 being substantially parallel with the longitudinal axis of the load arm 6. Longitudinally adjustable within the bore of the sleeve 10 is a shoe 12 provided with a series of holes 12' to receive a cross pin 13, by means of which the adjustment of the shoe in the sleeve may be effected. A tension spring 17 is connected to the arm 6 of the bell crank lever toward the outer end thereof, and to one of the A- frame members 3, and serves to automatically return the bell crank lever to its lowest position.

Any suitable power means for swinging the bell crank lever in a vertical plane to effect the desired elevation of the outer end of said lever, may be provided, but a preferable form of actuating device for the lever is that shown in the drawings, involving a fluid pressure device including a pump, a fluid pressure motor comprising a cylinder and a piston movable therein connected with the power arm of the lever 5, and a fluid pressure reservoir communicating with the pump and the motor cylinder. The motor cylinder 23, which is open at its forward end, is secured in axial alignment with the pressure reservoir 25, and both elements are supported by the longitudinal members 1, 1 of the frame. The piston 22 which is of the trunk type, is provided with a connecting rod 21 secured to the lower end of power arm 7 of lever 5 by pin 20. Mounted axially within the pressure reservoir 25 and supported in the front and rear heads of the reservoir, is a pump barrel 26, in which operates a plunger 28 secured to the end of a rod 27 which passes through a suitable gland or stuffing box 29 on the rear end of the barrel, said rod 27 being connected by a link 30 with a rock arm 31 connected to the pump brake or handle 32, which is pivoted to a bracket 33 bolted to the rear face of the reservoir 25. The forward head of the reservoir 25 is provided with an opening closed by a check valve 35, which affords communication between the forward end of the pump barrel and the cylinder 23, also with a radial duct 36 into which is tapped a check valve 36' controlling communication between the interior of the pressure reservoir and the suction side of the pump barrel in front of the piston. The upper portion of the front wall of the reservoir 25 is provided with a duct 37 establishing communication between the cylinder 23 and the pressure reservoir, and is controlled by a rod 38 passing longitudinally through the pressure reservoir and having reduced portion 39 which is adapted to be moved into and out of registry with the duct 37, to establish or cut off communication between the cylinder 23 and the pressure reservoir, the function of the rod 38, which is in effect a valve, being to relieve the pressure in the cylinder 23 and exhaust the fluid behind the piston 22, into the reservoir 25. The rear end of rod 38 is connected by a link 40 to an angular rock lever 41, pivoted on its shorter arm to a bracket 42 secured to the frame 1. The lever 41 which may be conveniently operated by the foot, is locked in its two positions of adjustment by means of an angular latch 44 pivoted to bracket 42 and having notches 45, 45 adapted to be engaged by a pin 46 on the long arm of lever 41, the horizontal arm of lever 44 being connected by a tension spring 43 with the pivot pin of lever 41, said spring 43 tending to throw the latch 44 into engagement with the pin 46, and thereby hold the lever 41 in fixed position.

It is desirable that means be provided for locking the rock lever 5 in its various positions of adjustment, thereby relieving the stresses on the fluid pressure actuating devices and insuring that the load will be held in its adjusted position. To this end the device is provided with an arc-shaped bar 51, having a series of teeth on its upper face, said bar being secured to a cross-shaft 50 journalled in the pendant ears or members 3' of the A-frame sections 3. Secured to the outer end of shaft 50 is a crank arm 52, to the upper end of which is attached a helical tension spring 53, the other end of the spring being hooked to a pull rod 54 which extends rearwardly of the main frame 1, and is secured to a lever 55, pivoted at 56 on the outer face of the frame member 1, said lever being limited in its downward movement by a stop 57, so that the point of connection of rod 54 with the lever is below the pivotal point of the latter, whereby the tension of spring 53 will normally hold said lever 55 in its lowermost rear position. The ratchet bar 51 is mounted in the same vertical plane as rock lever 5, so that when said lever 51 is elevated, a pawl 7' on the lower end of arm 7 of the rock lever co-operates with the teeth on the bar 51 and holds the rock lever 5 locked in its particular position of adjustment. As indicated, the bar 51 is held normally in its co-operative relation with the pawl on the end of lever arm 7 by the joint operation of lever 55, pull rod 54 and spring 53, when lever 55 is in its rearward or locked position, as shown in Fig. 1, and the pawl on the end of lever arm 7 will ride over the teeth on the ratchet bar 51, as the bell crank lever is moved outwardly and upwardly, the spring 53 permitting the ratchet bar 51 to yield or swing downwardly, as will be apparent from the showing in Fig. 1. When the lever 55 is swung to its opposite position the end of rod 54, connected to said lever, moves to the other side of pivot 56, thereby relieving the tension on the ratchet bar 51 and permitting the latter to drop out of co-operative engagement with the pawl 7', the downward movement of the ratchet bar being limited by a stop 51' which is engaged by the crank arm 52.

In operating the device as described, the bell crank lever 6 may be swung manually from its lowest position, in which the bottom of the sleeve 10 just clears the floor, until the shoe 12 engages the load to be lifted, as for example, the front or rear end of an automobile, in which case the shoe will be engaged with the front or rear axle. The bell crank lever will be held in its initial adjustment under the load by the engagement of the pawl 7' on the end of lever arm 7 with the particular tooth of the ratchet bar 5 which lies adjacent the pawl 7'. The pump plunger 28 is then operated by the brake or handle 32 and withdraws the fluid pressure medium from the reservoir 25 past check valve 36' and through duct 36 and discharges said fluid pressure medium past check valve 35 into the cylinder 23 behind the piston 22, the valve 38 being closed. As the pressure behind piston 22 is built up, the latter will be moved forward in cylinder 23, causing the piston rod 21 to swing the arm 7 of bell crank lever 5 forward, and the load arm 6 of said lever upward, until the outer end of said lever 6 attains the desired elevation. During this movement radius rods 14 maintain the sleeve 10 and the shoe 12 in vertical position, so that the lifting force is applied vertically beneath the load, and the tendency of the latter to shift is obviated. The forward movement of the lever arm 7 causes the pawl 7' on the lower end thereof to ride over the teeth of the ratchet bar, and when the outer end of the bell crank lever has attained the desired elevation, the pawl 7 will retain the lever in its adjusted position, by engagement with the particular tooth of the ratchet bar with which said pawl is in contact. This latter condition admits of the fluid pressure in cylinder 23 being released immediately after the lifting operation has been completed, and such relation is effected by depressing lever 41 with the foot, thereby snapping the pin 46 out of engagement with the upper notch 45 in latch 41, and into engagement with the lower notch in said lever, the rocking movement of lever 41 moving valve rod 38 rearwardly until the reduced sections 39 of said rod comes into registry with the exhaust port 37, opening communication between cylinder 23 and pressure reservoir 35, and permitting the fluid medium in said cylinder to be exhausted back into the reservoir 25. Ordinarily however the pressure in cylinder 23 will be maintained until it is desired to lower the load, in which case, when the load is to be lowered, valve 38 will be shifted as indicated to exhaust the pressure from the cylinder 23 into the reservoir 25, and the ratchet bar 51 will be disengaged from pawl 7', by moving the ratchet bar 51 out of engagement with said pawl through the release of lever 55, after which the movement of the rock lever will be gradually reversed by the load, the gradual escape of the pressure medium from behind the piston 23 permitting the load to be lowered without shocks or jars. After the load has been released, the downward movement of the rock lever is continued by the action of spring 17, until the outer end of the rock lever reaches its lowest position. If it is desired to hold the rock lever in its ultimate adjustment, with the load elevated to the point desired, by the action of the fluid pressure medium alone, the ratchet bar 51 may be thrown out of commission by swinging the lever 55 upward until the end of rod 54, connected to lever 55, passes above the plane through the pivotal axis of said rod 55, when spring 53 will snap the rod 55 over into its reverse position, thereby relieving the tension on spring 53 and permitting ratchet bar 51 to drop until its motion is arrested by crank arm 52 engaging stop lug 51. Under these conditions the pressure behind the piston 52 will hold the load in elevated position until the pressure in the cylinder is released by moving valve rod 38 to open up connection between the cylinder 23 and the pressure reservoir 25, as hereinbefore explained.

It will be particularly noted that the parts of the apparatus are relatively few, simple and durable in construction, and not liable to wear or impairment. It will be seen further that the lifting range of the jack is exceptionally great, as the outer end of the load arm 6 is capable of moving through an arc of approximately 90 degrees. Furthermore the vertical lift of the load may be materially increased by adjusting the shoe 13 upwardly in the sleeve 10 by shifting the locking pin 13 into engagement with one of the lower holes 12' in the shoe. Furthermore the particular arrangement of the pump brake or handle 32 admits of the latter being employed as a tongue or handle for moving the jack, or the jack and its load from place to place.

What I claim is:—

1. A lifting jack comprising a supporting frame, a bell-crank lever having a forwardly extending load arm and a downwardly extending power arm pivoted on a horizontal axis thereon, a sleeve pivoted to the load end of said lever, a shoe mounted in said sleeve, a rod connecting said pivoted sleeve with the frame, and actuating means connected with said power arm.

2. A lifting jack comprising a supporting frame, a bell-crank lever having a forwardly extending load arm and a downwardly extending power arm pivoted to swing in a vertical plane on said frame and having a forked end on its load arm, a sleeve pivoted on a horizontal axis in the fork, a shoe mounted for vertical adjustment in said sleeve, a reach rod substantially parallel with the load arm pivotally connected to said sleeve and to the frame whereby said sleeve is maintained in vertical position, and actuating means connected with said power arm.

3. A lifting jack comprising a supporting frame, a bell-crank lever having a forwardly extending load arm and a downwardly extending power arm pivoted on a horizontal axis thereon, a sleeve pivoted to the load end of said lever, a shoe mounted in said sleeve, a rod connecting said pivoted sleeve with the frame, and fluid pressure actuating means connected with said power arm.

4. A lifting jack comprising a supporting frame, a bell-crank lever having a forwardly extending load arm and a downwardly extending power arm pivoted to swing in a vertical plane on said frame, a sleeve carried by the load arm of said lever, actuating means on said frame connected with the power arm of said lever, and means for locking the lever in any adjusted position including a pawl on the lower end of the power arm, a bar having ratchet teeth thereon pivoted to the frame, and means for moving said bar into and out of the path of movement of said pawl.

5. A lifting jack comprising a supporting frame, a bell-crank lever pivoted to swing in a vertical plane on said frame, a sleeve carried by the load arm of said lever, actuating means on said frame connected with the power arm of said lever, a pawl on the lower end of the power arm, a bar having ratchet teeth thereon pivotally supported at one end on the frame and adapted to be moved into and out of the path of movement of the pawl, and means including a yieldable tension element for holding the bar in operative engagement with said pawl.

6. A lifting jack comprising a supporting frame, a bell-crank lever pivoted to swing in a vertical plane on said frame, a shoe carried by the load arm of said lever, actuating means on same frame connected with the power arm of said lever, a shaft journalled transversely of the frame, a ratchet bar secured to said shaft, a crank arm on said shaft, a lever for operating said crank arm, and connections between said lever and crank arm including a tensile spring and a pull rod.

7. A lifting jack comprising a supporting frame, a bell-crank lever pivoted to swing in a vertical plane on said frame, a shoe carried by the load arm of said lever, actuating means on said frame connected with the power arm of said lever, a shaft journalled transversely of the frame, a ratchet bar secured to said shaft, a crank arm on said shaft, a lever pivoted at one end to the frame for operating said crank arm, connections between said lever and crank arm including a helical tension spring and a pull rod connected to the lever intermediate its ends, and a stop for limiting the movement of the lever in a rearward and downward direction.

8. A lifting jack comprising a supporting frame, a bell-crank lever having a forwardly extending load arm and a downwardly extending power arm pivoted on a horizontal axis on said frame, a load engaging shoe pivotally supported on the load arm of said lever, a cylinder in the rear of said lever, a piston in said cylinder, a rod connecting the other arm of said lever with the piston, a pressure reservoir to the rear of the cylinder, a pump extending longitudinally through said reservoir, valved passages from the pump to the cylinder and from the reservoir to the pump, an exhaust passage from the cylinder to the reservoir, a valve controlling the exhaust passage, a handle supported on the reservoir for operating the pump, and a lever adjacent the pump handle for operating the exhaust valve.

In testimony whereof I affix my signature.

CARLTON G. HARRIS.